United States Patent
Zyck et al.

(10) Patent No.: US 11,166,474 B2
(45) Date of Patent: Nov. 9, 2021

(54) TEMPERED XYLITOL COATING FOR CHEWING GUMS

(71) Applicant: WM. WRIGLEY JR. COMPANY, Chicago, IL (US)

(72) Inventors: Daniel J. Zyck, N. Riverside, IL (US); Phillip Bates, Chicago, IL (US); Dennis Abad, Woodridge, IL (US); Ulesses P. Orr, Chicago, IL (US); Daniel J. Sitler, Naperville, IL (US); Javier Gonzalez, Chicago, IL (US)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 0 days.

(21) Appl. No.: 16/094,921

(22) PCT Filed: Apr. 21, 2017

(86) PCT No.: PCT/US2017/028742
§ 371 (c)(1),
(2) Date: Oct. 19, 2018

(87) PCT Pub. No.: WO2017/184926
PCT Pub. Date: Oct. 26, 2017

(65) Prior Publication Data
US 2021/0068417 A1    Mar. 11, 2021

Related U.S. Application Data

(60) Provisional application No. 62/326,614, filed on Apr. 22, 2016.

(51) Int. Cl.
*A23G 4/10* (2006.01)
*A23G 4/20* (2006.01)
*A23G 4/06* (2006.01)

(52) U.S. Cl.
CPC .............. *A23G 4/10* (2013.01); *A23G 4/20* (2013.01); *A23G 4/06* (2013.01); *A23V 2002/00* (2013.01)

(58) Field of Classification Search
CPC ... A23G 4/10; A23G 4/20; A23G 4/00; A23V 2002/00

USPC ........................................................ 426/5, 89
See application file for complete search history.

(56) References Cited

U.S. PATENT DOCUMENTS

| | | | |
|---|---|---|---|
| 4,127,677 A | 11/1978 | Fronczkowski | |
| 4,753,790 A | 6/1988 | Silva | |
| 5,144,024 A * | 9/1992 | Pepper | A61K 8/345 127/58 |
| 5,270,061 A * | 12/1993 | Reed | A23G 4/046 426/303 |
| 5,651,936 A | 7/1997 | Reed | |
| 5,965,181 A * | 10/1999 | Barkalow | A23G 3/26 426/103 |
| 6,586,023 B1 * | 7/2003 | Song | A23G 4/025 424/440 |
| 2001/0002998 A1 | 6/2001 | Ream | |
| 2001/0018084 A1 | 8/2001 | Nurmi | |
| 2013/0101706 A1 | 4/2013 | Haseleu | |
| 2014/0127353 A1 | 5/2014 | Kamakura | |

FOREIGN PATENT DOCUMENTS

| | | |
|---|---|---|
| EP | 0273000 A1 | 6/1988 |
| WO | WO9507621 A1 | 3/1995 |
| WO | WO9507625 A1 | 3/1995 |
| WO | WO2008100851 A1 | 8/2008 |
| WO | WO2017059005 A1 | 4/2017 |

* cited by examiner

*Primary Examiner* — Jyoti Chawla

(57) ABSTRACT

Tempered xylitol coatings and methods for applying the same are disclosed. A gum coating device coats a gum core with a first syrup to form a first coating, wherein the first syrup comprises xylitol, a first coating impurity, and a binder. The first syrup does not include a coloring agent and the first coating impurity is selected to slow the crystallization of xylitol. The gum coating device coats an outer surface of the first coating with a second syrup to form a second coating. The second syrup comprises xylitol, a second coating impurity, a binder, and a coloring agent. The second coating impurity is selected to slow the crystallization of xylitol. The gum coating device tempers the gum core after at least a first layer of the first coating is applied and before a last layer of the second coating is applied.

15 Claims, 1 Drawing Sheet

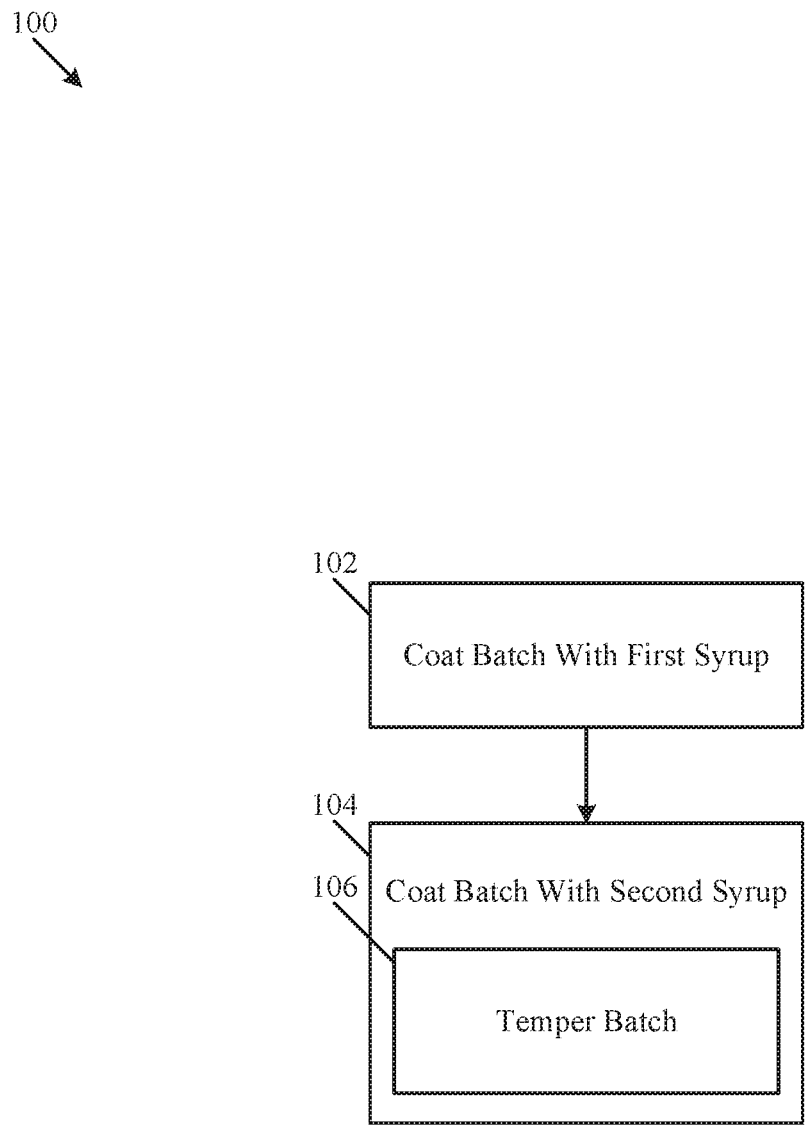

TEMPERED XYLITOL COATING FOR CHEWING GUMS

BACKGROUND

Chewing gums are commonly produced as pellets, balls, or other shapes with hard coatings to allow for a pleasant crunch upon chewing. The coating can be formed by applying layers of sugar or sugar alcohol (or polyhydric alcohol or polyol) syrup to batches of gum cores, and then allowing the syrup to crystalize and harden.

Crystalline xylitol can be used as a bulking agent and coating material in sugarless chewing gums. Xylitol provides sugar-like sweetness and anti-cariogenic properties that are desirable and useful in gum coatings. In crystalized form, xylitol also provides a pleasantly crunchy coating with good shelf life.

However, using xylitol in gum coatings can present some challenges. Xylitol tends to crystalize very quickly relative to sugar and other sugar alcohols, and as such, can result in uneven, bumpy, or pitted coating surfaces when applied through traditional coating methods. Such imperfections become readily apparent when deep or dark colored dyes are mixed in with xylitol syrup, as color at lower and thinner areas in the coating are lighter and less intense relative to the higher and thicker areas of the coating.

SUMMARY

One embodiment relates to a chewing gum product. The chewing gum product includes a gum core comprising an insoluble portion and a soluble portion. The chewing gum product further includes a first coating comprising at least one layer of a first syrup applied to an outer surface of the gum core, the first syrup comprising xylitol, a first coating impurity, and a binder, wherein the first syrup does not include a coloring agent, and wherein the first coating impurity is selected to slow the crystallization of xylitol. The chewing gum product includes a second coating comprising at least one layer of a second syrup applied to an outer surface of the first coating, the second syrup comprising xylitol, a second coating impurity, the binder, and a coloring agent, wherein the second coating impurity is selected to slow the crystallization of xylitol.

Another embodiment relates to a method of producing a chewing gum product. The method includes coating, by a gum coating device, a gum core with a first syrup to form a first coating, wherein the first syrup comprises xylitol, a first coating impurity, and a binder, wherein the first syrup does not include a coloring agent, and wherein the first coating impurity is selected to slow the crystallization of xylitol. The method further includes coating, by the gum coating device, an outer surface of the first coating with a second syrup to form a second coating, wherein the second syrup comprises xylitol, a second coating impurity, a binder, and a coloring agent, wherein the second coating impurity is selected to slow the crystallization of xylitol. The method includes tempering, by the gum coating device, the gum core after at least a first layer of the first coating is applied and before a last layer of the second coating is applied.

BRIEF DESCRIPTION OF THE DRAWINGS

FIG. 1 is a block diagram illustrating a method of coating a chewing gum product, according to an example embodiment.

DETAILED DESCRIPTION

The present invention relates chewing gums with xylitol coatings. The fundamental components of chewing gum typically include a water-insoluble portion and a water-soluble portion. The water-insoluble portion includes a gum base that may constitute 5 to 90% by weight of the product. More typically, the gum base may constitute 10 to 50% or 15 to 40% or 20 to 35% by weight of the chewing gum.

The primary component of the gum base is an elastomeric polymer which provides the characteristic chewy texture of the product. Elastomeric polymers provide the rubbery, cohesive nature to the gum which varies depending on a given polymer's chemical structure and how it may be compounded with other ingredients. Natural elastomers may include natural rubber such as smoked or liquid latex and guayule, natural gums such as jelutong, lechi caspi perillo, massaranduba balata, massaranduba chocolate, nispero, rosidinha, chicle, gutta percha, gutta kataiu, niger gutta, tenu, chilte, chiquibul, gutta hang kang. Synthetic elastomers may include high molecular weight elastomers such as butadiene-styrene copolymers and isobutylene-isoprene copolymers. Other polymers which sometimes serve as elastomers include polybutadiene and polyisobutylene, vinyl polymers such as polyvinyl acetate, polyethylene, vinyl copolymeric elastomers such as vinyl acetate/vinyl laurate, vinyl acetate/vinyl stearate, ethylene/vinyl acetate, polyvinyl alcohol or mixtures thereof. These polymers perform well when used in combination with butadiene-styrene copolymers and isobutylene-isoprene copolymers.

Vinyl polymeric and copolymeric type elastomers provide tack resistance, vary the chew characteristics of gums made from these bases and offer hydrophilic properties beneficial to sensory perception of the final gums. For copolymeric types, the amount of vinyl laurate, vinyl stearate, or ethylene present in the vinyl laurate/vinyl acetate (VLNA), vinyl stearate/vinyl acetate (VSNA), or ethylene/vinyl acetate (EVA) copolymers respectively may range from about 10 to about 60 percent by weight of the copolymer. Average molecular weights of these polymers may range from about 2,000 to about 80,000. Ball and ring softening points of these polymers may range from about to 50 to 120° C. In some arrangements, gum base includes polyvinyl acetate having an average molecular weight from about 8,000 to about 52,000. In some such arrangements, chewing gum bases include polyvinyl acetate having an average molecular weight of about 10,000 to about 35,000, and for bubble gum bases about 30,000 to about 60,000. Vinyl polymers typically release flavor quickly, and using iso-alkanic waxes exhibiting small crystalline structure with these vinyl polymers extends flavor release.

The gum base may include other ingredients that modify the chewing properties or aid in processing the overall product. These ingredients may include waxes, plasticizers, softeners, fillers, emulsifiers, plastic resins, colorants, antioxidants, and so on. The variety of gum base ingredients provide the ability to further modify the chewing characteristics of gums made from the gum base.

Petroleum waxes aid in the curing of the finished gum made from the gum base as well as improve shelf-life and texture. Wax crystal size when hard also improves the release of flavor. Those waxes high in iso-alkanes have a smaller crystal size than those waxes high in normal-alkanes, especially those with normal-alkanes of carbon numbers less than 30. The smaller crystal size allows slower release of flavor since there is more hindrance of the flavor's escape from this wax versus a wax having larger crystal sizes.

Synthetic waxes are produced by means atypical of petroleum wax production. The synthetic waxes may include waxes containing branched alkanes and copolymerized with monomers such as, but not limited to, propylene and polyethylene and Fischer-Tropsch type waxes. Polyethylene wax is not in the same category as polyethylene, a polymer of ethylene monomers.

Elastomer solvents (sometimes called elastomer plasticizers) vary the firmness of the gum base. Their specificity on elastomer inter-molecular chain breaking (plasticizing) along with their varying softening points cause varying degrees of finished gum firmness when used in base. This is also important when one wishes to provide more elastomeric chain exposure to the alkanic chains of the waxes. Elastomer solvents include natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, partially hydrogenated methyl esters of rosin, pentaerythritol ester of rosin, synthetic elastomer plasticizers such as terpene resins derived from aipha-pinene, beta-pinene and/or d-limonene, and mixtures thereof. The elastomer solvents used may be of one type or of combinations of more than one. Typically, the ratios of one to the other are dependent on each respective softening point, on each effect on flavor release, and on each respective degree of tack they cause to the gum. Ball and ring softening points of the rosin ester types described above may range from about 60 to about 120° C. Softening points of the terpene resins may range from about 60 to about 130° C. and an average molecular weight of from about 500 to 2,000. In some arrangements, both terpene and rosin ester resins are used together.

Softeners modify the texture, cause the hydrophobic and hydrophilic components of the base to be miscible, and may further plasticize the synthetic elastomers of the gum base. Softeners include fully hydrogenated oils of cottonseed, soybean, palm, palm kernel, coconut, safflower and the like, as well as monoglycerides, diglycerides, acetylated monoglycerides, distilled mono- and digiycerides and de-oiled or "powdered" lecithin. The glycerides and lecithin are sometimes referred to as emulsifiers.

Fillers used in gum base modify the texture of the gum base and aid in processing. Fillers include carbonate or precipitated carbonated types such as magnesium and calcium carbonate, ground limestone and silicate types such as magnesium and aluminum silicate, clay, alumina, talc, as well as titanium oxide, mono-di- and tricalcium phosphate, cellulose polymers such as ethyl, methyl and wood or mixtures thereof.

Other optional ingredients such as antioxidants and colorants may also be used in the gum base. Antioxidants prolong shelf-life and storage of gum base, finished gum or their respective components including fats and flavor oils. Antioxidants suitable for use in gum base or gum of the present invention include butylated hydroxyanisole (BHA), butylated hydroxytoluene (BHT), beta-carotenes, tocopherols, acidulants such as Vitamin C, propyl gallate, other synthetic and natural types or mixtures thereof in free-flowing ground or pulverized form.

The water soluble portion of chewing gum includes a bulking agent and may further include with minor amounts of secondary components such as flavors, high-intensity sweeteners, colorants, softeners, gum emulsifiers, acidulants, sensates, and so on.

In various arrangements, chewing gum pieces may be coated with a dissolved polyol syrup that includes xylitol. In some such arrangements, the polyol syrup includes xylitol and mannitol. The coating may further include additional ingredients to improve the color and performance of the gum coating. Such additional ingredients may include a binder and/or a film former (e.g., a 40% solution of gum arabic or gum tahla) and coloring agents (e.g., titanium dioxide, natural coloring, and artificial coloring). These additional ingredients are commonly added to the polyol solution which constitutes the coating syrup.

Xylitol solution can be prepared as part of a conventional xylitol manufacturing process. In such processes, biomass containing high levels of xylan (a polymer of xylose) is used as a starting material. Suitable biomass sources for this purpose may include corn cobs, birch wood or other suitable sources are subjected to acid or enzyme hydrolysis to break the xylan polymer into individual xylose sugar molecules. The biomass is subjected to acid or enzyme hydrolysis to convert the xylan polymer into xylose. Some purification may be performed at this stage such as the removal of waste solids. The xylose solution is then subjected to hydrogenation to convert xylose and any other sugars present into their corresponding sugar alcohols (polyols). Xylose, which forms the majority of the sugars present, it is converted into xylitol during the hydrogenation process. At this point, xylitol solution may be subjected to an energy intensive crystallization step to produce crystalline xylitol. In some arrangements, a "mother liquor" xylitol solution may be used in lieu of performing the crystallization step, as described in U.S. App. No. 62/235,446.

Xylitol solutions suitable for use in the present invention may be obtained from crystalline xylitol manufacturers such as Danisco of Europe and Huakang Pharmaceutical Co in Zhejiang, China.

A variety of flavoring agents can also be used, if desired. The flavor may be used in amounts of about 0.1 to about 15 percent by weight of the gum. In some arrangements, flavor amounts of about 0.2% to about 5% by weight are used. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion. Included in the general category of flavors are sensates, chemicals which impart physiological sensations in the mouth such as cooling agents, warming agents and tingling agents. Examples of cooling agents include menthol, WS-23, WS-3, WS-5, isopulegol, esters of menthol such as menthyl succinate, menthyl lactate and menthyl glutarate, among others. Warming and tingling agents include capsaicin, piperine, jambu and spilanthol.

Referring to FIG. 1, a coating method 100 incorporates at least two xylitol-based syrup formulations to create smooth, evenly colored chewing gum products. Although discussed in the context of chewing gums below, the method 100 may also be used to coat various types of confections (e.g., mints, chewy candies, and so on) where a smooth and evenly colored xylitol-based outer shell is desirable.

The method 100 may be performed through any of various pellet coating devices capable of performing syrup coating operations pursuant to specified parameters. Such devices may be configured to effectuate specified operations under specified conditions as discussed in more detail below. The coating devices may be configured to operate on a batch of gum disposed in a rotating drum, which may include a plurality of fins configured to facilitate movement of individual gum pieces throughout a gum bed as the drum rotates. The drum may further include a plurality of apertures through which air may be circulated to facilitate drying operations and/or to maintain temperatures and humidity within the drum. The gum batch may be coated via controlled volumes of syrup delivered through a gallery of sprayers oriented towards the gum bed within the drum. For example, the method 100 may be performed by Driacoater™ production machines available through DRIAM Anlagenbau GmbH.

In various arrangements, pellet coating devices may be configured to coat batches of gum pellets through a plurality of phases, such that each phase includes one or more cycles that in turn include a series of operations. For example, a coating process may include eight phases, with each phase having one to five cycles. A given cycle may include one or more of a syrup spraying operation to add a layer of coating syrup to a gum batch, a pause operation (i.e., an interruption in the syrup spraying operation, which may include an interruption in airflow), and a drying operation. Each step may be performed under specified parameters, for example, duration of each operation may be predetermined and set, amount of syrup sprayed during each syrup spraying operation may be predetermined and set, and so on. In addition, temperature, humidity, as well as airflow direction, volume, and speed may be predetermined and set for each cycle of each phase as well. Where the pellet coating device includes a rotating drum, the rate of drum rotation may be controlled during each step.

One or more phases may be configured with distinct parameters and/or perform different operations. For example, in one arrangement, an initial phase (e.g., phase 1) does not include a syrup spraying operation, but instead includes a period of drum rotation and an airflow to remove dust and particulate matter from a gum batch. Subsequent phases (e.g., phases 2-5) include syrup spraying operations to add layers of coating syrup to the gum batch, with increasing amounts of syrup being applied at each phase. The coating process may conclude with one or more phases configured to polish the gum batch (e.g., where wax is added to the gum batch, and then the gum batch is allowed to tumble within the coating device).

At 102, a gum batch is coated with a first syrup. The gum batch includes a plurality of individual consumable product pieces that are subject to the coating method 100. In some arrangements, the gum batch includes a plurality of gum core pellets formed of a gum base (e.g., formed of the insoluble portion discussed above) and a water soluble chewing gum portion (also discussed above), which have been mixed, extruded, scored, and broken into a desired shape and size. The gum batch may be coated with the first syrup over the course of a plurality of phases in a pellet coating device.

The first syrup includes water, xylitol, gum tahla, and mannitol, which may be present in the ratios provided in Table 1. As one of skill in the art would recognize, other binders or film formers may be used in place of gum tahla, which may affect the ratios of the other components of the syrup accordingly.

TABLE 1

(values as percent weight on a wet basis)

| First Syrup Components | Effective Range | Preferred Range | Preferred Ratio |
| --- | --- | --- | --- |
| Water | 15.0-28.0% | 18.0-25.0% | 21.3% |
| Xylitol | 65.0-75.0% | 67.0-73.0% | 69.7% |
| Gum Tahla | 4.0-10.0% | 5.0-7.0% | 6.0% |
| Mannitol | 1.0-15.0% | 2.0-4.0% | 3.0% |

Mannitol provides an impurity in the first syrup, and as such, slows the crystallization of xylitol. Slowing the crystallization of xylitol gives rise to a gum coating that is smoother and more uniform compared to other xylitol-based syrups without mannitol. In addition, coloring agents are absent from the first syrup. In various arrangements, the first syrup makes up at least half of the overall coating weight of each pellet. In some such arrangements, the first syrup makes up the majority of the overall coating weight of each pellet (e.g., 60% or more).

At 104, the gum batch is coated with a second syrup. Similar to the first syrup, the second syrup includes water, xylitol, gum tahla (or other binder or film former, as mentioned above), and in some arrangements, mannitol. However, in contrast to the first syrup, the second syrup further includes a coloring agent (e.g., artificial or natural coloring). Example ratios of these components are shown in Table 2:

TABLE 2

(values as percent weight on a wet basis)

| Second Syrup Components | Effective Range | Preferred Range | Preferred Ratio |
| --- | --- | --- | --- |
| Water | 16.0-30.0% | 20.0-27.0% | 23.8% |
| Xylitol | 65.0-75.0% | 67.5-72.5% | 69.4% |
| Gum Tahla | 0.5-6.0% | 2.0-4.0% | 3.2% |
| Mannitol | 1.0-10.0% | 2.0-4.0% | 3.0% |
| Coloring Agent | 0.1-0.7% | 0.55-0.65% | 0.6% |

The second syrup may be applied to the batch in the same or similar manner as the first syrup (e.g., over the course of a plurality of phases in the pellet coating device).

At 106, the gum batch is tempered. Moisture content in the batch is controlled by tempering at 106 in order to produce a shiny finished product with a smooth and uniform color at the end of the method 100. Where an excess amount of moisture is retained in individual pellets in the batch, the final product at the end of the method 100 may take on a hazy or dull appearance that does not reflect a desired finished color. Such defects may arise due to moisture collectively migrating across coating layers outwards and toward the surface of each pellet.

Where coating syrups include materials that readily release moisture (e.g., xylitol), short and intermittent drying phases throughout the coating process may remove enough moisture to avoid a dull or hazy finished product. However, relative to xylitol, mannitol characteristically releases moisture slowly.

As such, the gum batch is tempered at 106 through an extended drying operation (e.g., application of heat, airflow, and gentle tumbling) to remove moisture from the gum batch. The gum batch may be tempered after the gum batch is coated with the first syrup at 102. In some arrangements, the gum batch is tempered at the last phase of 102. In other arrangements, the gum batch is tempered during one or more of the phases of 104.

No syrup is applied to the batch throughout the tempering stage at 106, and as such, the tempering stage significantly slows down the overall coating process. The duration of the tempering process may be influenced by the temperature and the solids content of the coating syrup applied at 102. In arrangements where the gum batch is tempered at a phase of 104, the duration of the tempering process may be influenced by the solids content of the coating syrup applied at 102 and 104. Generally, tempering duration may be shorter at higher temperature parameters and where the syrups applied before 106 have a higher solids content. However, although higher temperatures may allow for shorter tempering times, higher temperatures may also result in a rough coating surface. For example, where syrups with 71-73 Brix are applied, tempering at 27° C. for sixty minutes at 106 may be appropriate. Alternatively, two tempering stages of thirty minutes at 27° C. may be appropriate. In yet other arrangements, tempering stages may be incorporated in 104 through longer drying operations in multiple phases of 104 (i.e., compared to the duration of drying operations in 102). Other arrangements are possible as well.

After the batch is coated with the second syrup at 104 and tempered at 106, the batch may be subjected to a polishing process to further improve the finish of each pellet. In some arrangements where the method 100 is performed via a rotating drum, the batch may be polished by rotating the drum and thereby tumbling the gum batch therein.

In some arrangements, additional components may be added to the gum batch during the polishing process (e.g., waxes, oils, etc.). In some such arrangements, medium chain triglycerides (e.g., Neobee™ oil) and carnauba wax may be used as polishing compounds. In one such arrangement, after the gum batch is coated and tempered, a 1:1 blend of Neobee™ oil and carnauba wax is added to the gum batch in the coating device. The drum rotates without an internal airflow for two minutes, and then an airflow is provided in the drum for a following three minutes. Carnauba wax (i.e., without Neobee oil™) is then added to the gum batch, and the drum is rotated for five minutes without airflow, and then the drum is rotated with an airflow for ten minutes.

What is claimed is:

1. A chewing gum product comprising:
    a gum core comprising an insoluble portion and a soluble portion;
    a first coating comprising at least one layer of a first syrup applied to an outer surface of the gum core, the first syrup comprising xylitol, a first coating impurity, and a binder, wherein the first syrup does not include a coloring agent, and wherein the first coating impurity is selected to slow the crystallization of xylitol; and
    a second coating comprising at least one layer of a second syrup applied to an outer surface of the first coating, the second syrup comprising xylitol, a second coating impurity, the binder, and a coloring agent, wherein the second coating impurity is selected to slow the crystallization of xylitol,
    wherein the gum core is tempered after at least a first layer of the first coating is applied and before a last layer of the second coating is applied,
    wherein an overall coating comprises the first coating and the second coating, and wherein the overall coating comprises greater than 60% the first coating by weight,
    wherein each of the first coating impurity and the second coating impurity is mannitol, and
    wherein each of the first coating and the second coating comprises 2-4% mannitol by wet weight.

2. The chewing gum product of claim 1, wherein the binder is gum tahla.

3. The chewing gum product of claim 2, wherein the first coating comprises 65-75% xylitol by wet weight and 2-4% the first coating impurity by wet weight.

4. The chewing gum product of claim 2, wherein the first coating comprises 67-73% xylitol by wet weight and 2-4% the first coating impurity by wet weight.

5. The chewing gum product of claim 2, wherein the second coating comprises 65-75% xylitol by wet weight, 2-4% the second coating impurity by weight, and 0.1-0.7% the coloring agent by wet weight.

6. The chewing gum product of claim 2, wherein the second coating comprises 67.5-72.5% xylitol by wet weight, 2-4% the second coating impurity by wet weight, and 0.55-0.65% the coloring agent by wet weight.

7. A method of producing a chewing gum product, the method comprising:
    coating, by a gum coating device, a gum core with a first syrup to form a first coating, wherein the first syrup comprises xylitol, a first coating impurity, and a binder, wherein the first syrup does not include a coloring agent, and wherein the first coating impurity is selected to slow the crystallization of xylitol;
    coating, by the gum coating device, an outer surface of the first coating with a second syrup to form a second coating, wherein the second syrup comprises xylitol, a second coating impurity, a binder, and a coloring agent, wherein the second coating impurity is selected to slow the crystallization of xylitol; and
    tempering, by the gum coating device, the gum core after at least a first layer of the first coating is applied and before a last layer of the second coating is applied;
    wherein an overall coating comprises the first coating and the second coating, and wherein the overall coating comprises greater than 60% the first coating by weight;
    wherein each of the first coating impurity and the second coating impurity is mannitol; and
    wherein each of the first coating and the second coating comprises 2-4% mannitol by wet weight.

8. The method of claim 7, wherein the gum coating device forms the first coating over a plurality of first coating phases, and wherein the gum core is tempered after at least one of the plurality of first coating phases.

9. The method of claim 7, wherein the gum coating device forms the second coating over a plurality of second coating phases, and wherein the gum core is tempered after at least one of the plurality of second coating phases.

10. The method of claim 7, wherein the gum coating device forms the first coating over a plurality of first coating phases and forms the second coating over a plurality of second coating phases, and wherein the gum core is tempered during more than one phase of the first coating phases and the second coating phases.

11. The method of claim 7, wherein the binder is gum tahla.

12. The method of claim 11, wherein the first coating comprises 65-75% xylitol by wet weight and 2-4% the first coating impurity by wet weight.

13. The method of claim 11, wherein the first coating comprises 67-73% xylitol by wet weight and 2-4% the first coating impurity by wet weight.

14. The method of claim 11, wherein the second coating comprises 65-75% xylitol by wet weight, 2-4% the second coating impurity by wet weight, and 0.1-0.7% the coloring agent by wet weight.

15. The method of claim 11, wherein the second coating comprises 67.5-72.5% xylitol by wet weight, 2-4% the second coating impurity by wet weight, and 0.55-0.65% the coloring agent by wet weight.

\* \* \* \* \*